US009407832B2

(12) United States Patent
Peng

(10) Patent No.: US 9,407,832 B2
(45) Date of Patent: Aug. 2, 2016

(54) MULTI-EXPOSURE IMAGING SYSTEM AND METHOD FOR ELIMINATING ROLLING SHUTTER FLICKER

(71) Applicant: Himax Imaging Limited, Tainan (TW)

(72) Inventor: Yuan-Chih Peng, Tainan (TW)

(73) Assignee: HIMAX IMAGING LIMITED, Tainan (TW)

( * ) Notice: Subject to any disclaimer, the term of this patent is extended or adjusted under 35 U.S.C. 154(b) by 120 days.

(21) Appl. No.: 14/261,827

(22) Filed: Apr. 25, 2014

(65) Prior Publication Data

US 2015/0312464 A1 Oct. 29, 2015

(51) Int. Cl.
*H04N 9/73* (2006.01)
*H04N 5/235* (2006.01)
*H04N 5/355* (2011.01)
*H04N 5/353* (2011.01)
*H04N 5/374* (2011.01)

(52) U.S. Cl.
CPC ........... *H04N 5/2357* (2013.01); *H04N 5/3532* (2013.01); *H04N 5/35581* (2013.01); *H04N 5/374* (2013.01)

(58) Field of Classification Search
CPC .............. H04N 5/2357; H04N 5/3532; H04N 5/35581; H04N 5/374
See application file for complete search history.

(56) References Cited

U.S. PATENT DOCUMENTS

| | | | | |
|---|---|---|---|---|
| 2004/0165091 A1* | 8/2004 | Takemura | ............ | H04N 5/2355 348/296 |
| 2004/0218830 A1* | 11/2004 | Kang | ........................ | G06T 5/50 382/274 |
| 2008/0158396 A1* | 7/2008 | Fainstain | ............... | H04N 5/361 348/246 |
| 2009/0086054 A1* | 4/2009 | Maeda | ................. | H04N 5/2351 348/226.1 |
| 2012/0002074 A1* | 1/2012 | Baba | ...................... | H04N 5/235 348/228.1 |

* cited by examiner

*Primary Examiner* — Trung Diep
(74) *Attorney, Agent, or Firm* — McClure, Qualey & Rodack, LLP

(57) ABSTRACT

A method for eliminating flicker of a multi-exposure imaging system is provided. The method includes the steps of: capturing a long exposure image based on a long exposure from a scene; capturing a short exposure image based on a short exposure from the scene; obtaining an exposure ratio of the long exposure to the short exposure; generating a long accumulated value by accumulating pixel values of a portion of the long exposure image; generating a short accumulated value by accumulating pixel values of a portion of the short exposure image corresponding to the portion of the long exposure image; and generating a flicker gain according to the long average value, the short average value and the exposure ratio.

16 Claims, 10 Drawing Sheets

MULTI-EXPOSURE IMAGING SYSTEM AND METHOD FOR ELIMINATING ROLLING SHUTTER FLICKER

BACKGROUND OF THE INVENTION

1. Field of the Invention

The present invention relates to image processing technology, and in particular relates to an apparatus or a method for eliminating flicker in a multi-exposure imaging system

2. Description of the Related Art

Cameras often use CMOS image sensors with an electronic rolling shutter. The electronic rolling shutter makes each line of the pixel array of the image sensor start an exposure procedure at a different time but with the same exposure duration. When the exposure duration is less than a half cycle of AC supply (for example, 1/60 second) or is not the exact multiple of a half cycle, each line of the pixel array of the image sensor captures a different luminance from flickering AC lighting fixtures such as fluorescent lamps, thus, producing alternating light and dark interlaced strips on an image. This is the so-called rolling shutter flicker.

A multi-exposure imaging system combines at least a short exposure image and a long exposure image of the same scene, for example, to increase the dynamic range of an image. Due to the shorter exposure duration of the short exposure image, the flicker problem caused by the unstable ambient light sometimes gets worse in multi-exposure imaging systems, and one usual flicker problem is caused by the rolling shutter flicker.

Therefore, it is desirable to provide a new apparatus or method for eliminating the rolling shutter flicker in the multi-exposure imaging system.

BRIEF SUMMARY OF THE INVENTION

The present invention provides a method for eliminating flicker of a multi-exposure imaging system. The method comprises the steps of: capturing a long exposure image based on a long exposure from a scene; capturing a short exposure image based on a short exposure from the scene; obtaining an exposure ratio of the long exposure to the short exposure; generating a long accumulated value by accumulating pixel values of a portion of the long exposure image; generating a short accumulated value by accumulating pixel values of a portion of the short exposure image corresponding to the portion of the long exposure image; and generating a flicker gain according to the long average value, the short average value and the exposure ratio.

The present invention provides an embodiment of a multi-exposure imaging system, in which a long exposure image sensor captures a long exposure image based on a long exposure from a scene, and a short exposure image sensor captures a short exposure image based on a short exposure from the scene. An exposure ratio calculator obtains an exposure ratio of the long exposure to the short exposure. A flicker gain detector generates a long accumulated value by accumulating pixel values of a portion of the long exposure image, generates a short accumulated value by accumulating pixel values of a portion of the short exposure image corresponding to the portion of the long exposure image, and generates a flicker gain according to the long accumulated value, the short accumulated value and the exposure ratio.

The present invention also provides an embodiment of a multi-exposure imaging system for capturing a video under an environment with a periodic flicker. The multi-exposure imaging system comprises a long exposure image sensor for capturing a first long exposure frame based on a long exposure from a scene and subsequently capturing a second long exposure frame based on the long exposure; a short exposure image sensor for capturing a first short exposure frame based on a short exposure from the scene and subsequently capturing a second short exposure frame based on the long exposure; an exposure ratio calculator for obtaining an exposure ratio of the long exposure to the short exposure; and a flicker gain estimator for generating a second flicker gain of the second short exposure frame based on a first flicker gain of the first short exposure frame.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
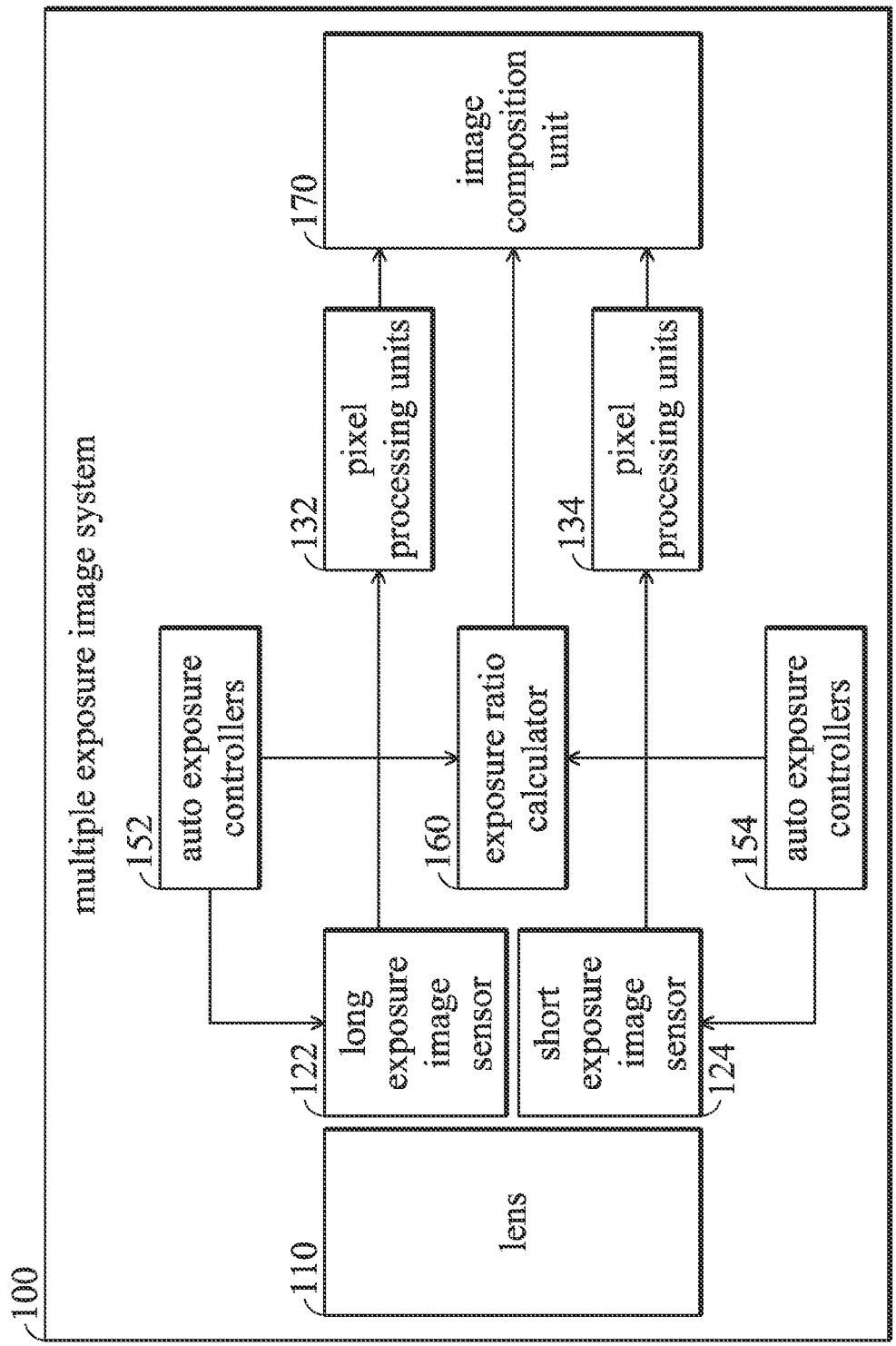
FIG. 1A shows the multi-exposure imaging system 100 of the prior art which uses a long and a short exposure image sensor 122 and 124 to capture the same scene.
Figure 1B:
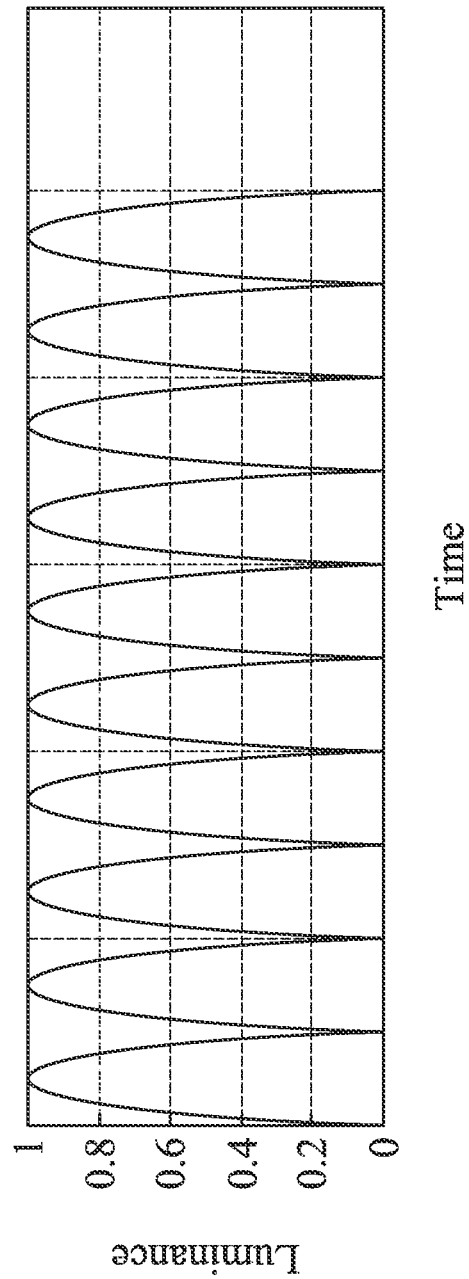
FIG. 1B illustrates a luminance variance of a fluorescent light.

FIG. 1A shows the an example of a multi-exposure imaging system 100 which uses a long and a short exposure image sensors 122 and 124 to capture the same scene. As shown in FIG. 1A, the image sensors 122 and 124 respectively capture images from the same scene via the same lens 110 (or different lens in another embodiment) with different exposure settings (including exposure time, gain of amplifier, etc.). The image sensors 122 and 124 may be independent pixel arrays or at different parts of one single pixel array. The pixel processing units 132 and 134 respectively perform preliminary image signal processing operation for the images produced from the image sensors 122 and 124. The auto exposure controllers 152 and 154 respectively adjust the exposure setting of the long and the short exposure image sensors 122 and 124. The exposure ratio calculator 160 can calculate an exposure ratio between the long and the short exposure of the image sensors 122 and 124 so that the image composition unit 170 can combine two images respectively captured by the long and the short exposure image sensors 122 and 124 into a composite image based on the exposure ratio. The rolling shutter flicker problem sometimes gets worse in multi-exposure imaging systems because the short exposure image sensor 124 in the multi-exposure imaging system 100 usually have shorter exposure duration than general imaging systems. FIG. 1B illustrates a luminance variance of a fluorescent light. The flickering frequency of the fluorescent light flickers is for example 120 Hz. The rolling shutter flicker problem is thus obvious especially in a multi-exposure imaging system.

Figure 2A:
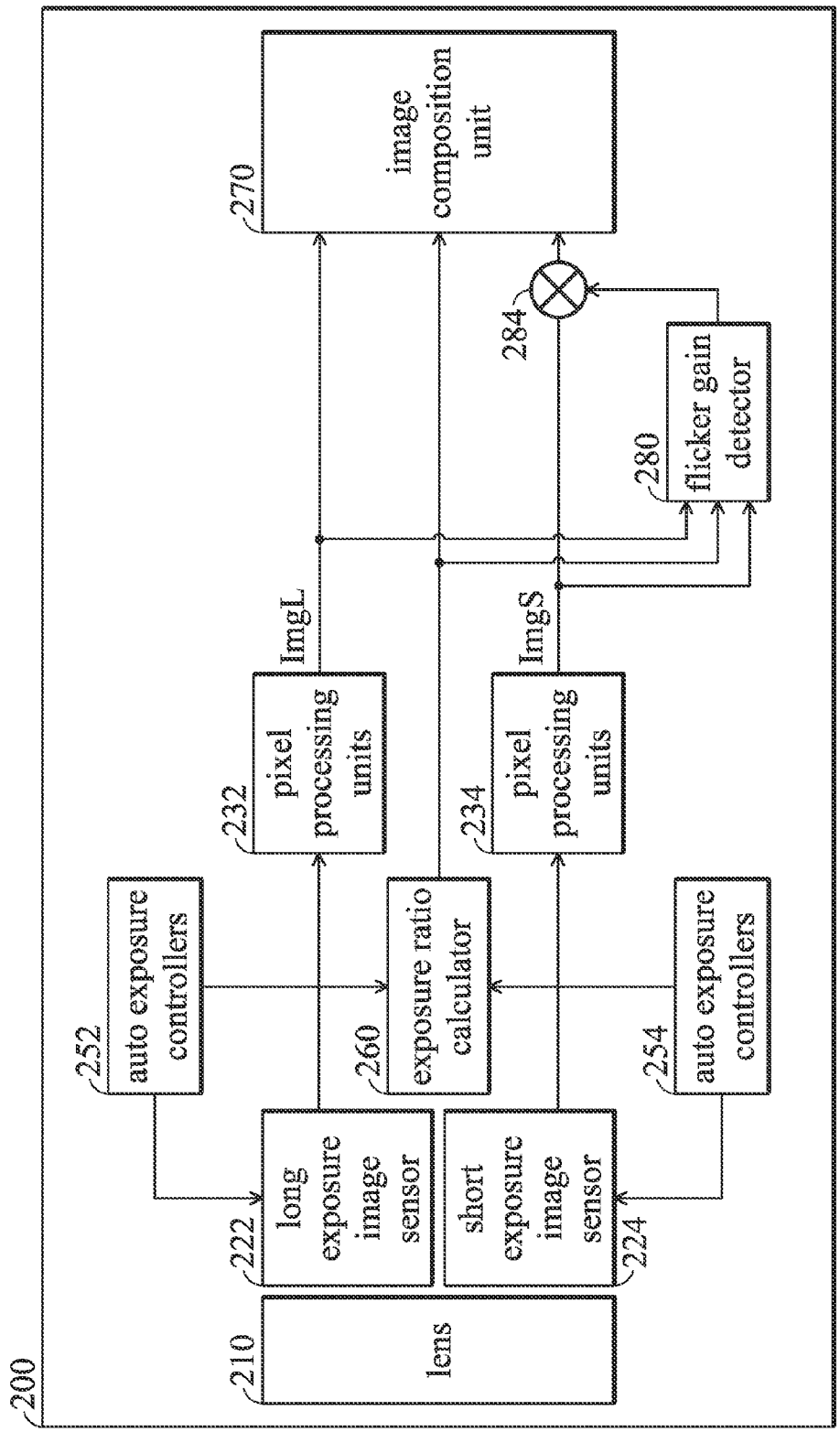
FIG. 2A is a schematic diagram of the multi-exposure imaging system according to an embodiment of the present invention.

FIG. 2A is a schematic diagram of the multi-exposure imaging system according to an embodiment of the present invention. In the multi-exposure imaging system 200, the long exposure image sensor 222 and short exposure sensor 224 respectively capture images from the same scene via the same lens 210 (or different lens at another embodiment) with a long exposure and a short exposure, that corresponds to different exposure settings (including exposure time, gain of amplifier, etc.). The pixel processing units 232 and 234 respectively perform preliminary image signal processing operations for the images from the image sensors 222 and 224 to generate a long exposure image ImgL and a short exposure image ImgS. The auto exposure controllers 252 and 254 adjust the exposure setting of the long exposure image sensor 222 and the short exposure image sensor 224. The exposure ratio calculator 260 can calculate an exposure ratio between the long exposure of the image sensor 222 and the short exposure of the image sensor 224.

In this embodiment, the flicker gain detector 280 receives the images ImgL and ImgS and the exposure ratio, to calculate a flicker gain "F_gain". Then, the compensator 284 compensates the pixel values of the line of the short exposure image ImgS by the flicker gain to generate an image ImgS' so as to eliminate the flicker. Finally the image composition unit 270 can combine images ImgL and ImgS' into a composite image based on the exposure ratio. In this embodiment, the compensator 284 is a multiplier for example, and does the compensation by multiplying the pixel values of the line of the short exposure image by the flicker gain.

A method for eliminating rolling shutter flicker of a multi-exposure imaging system is presented. For illustration, the method in an embodiment can be operated in the multi-exposure imaging system 200 in FIG. 2A.

Figure 2B:
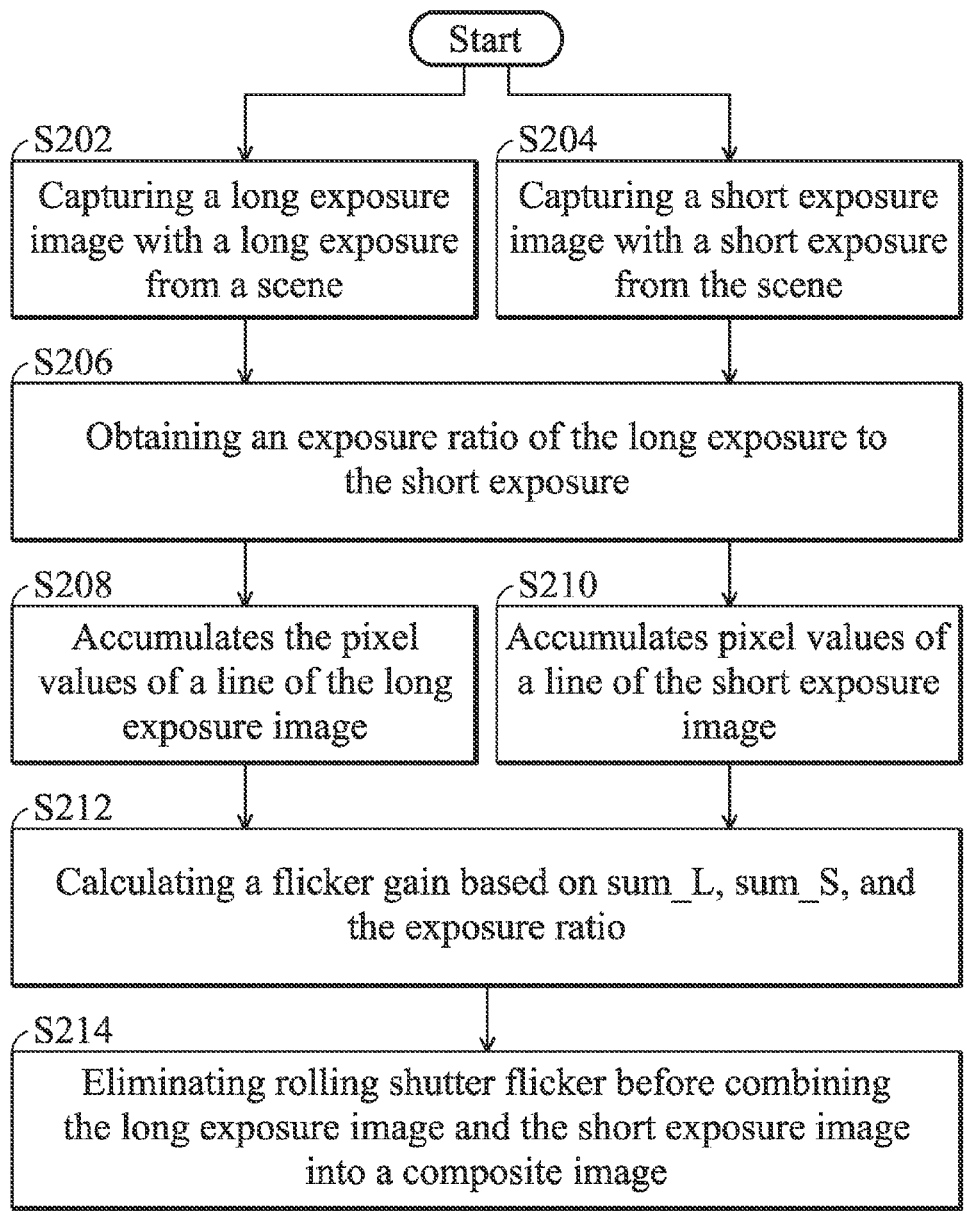
FIG. 2B shows the flow chart of the method of the present invention.

FIG. 2B shows the flow chart of the method of an embodiment of the present invention. The method first, in step S202, captures a long exposure image with a long exposure from a scene, for example, by the long exposure image sensor 222, and, in step S204, capturing a short exposure image with a short exposure from the scene, for example, by the short exposure image sensor 224. The long exposure is based on for example an exposure time and a signal gain of the long exposure image sensor 222, and the short exposure is based on for example an exposure time and a signal gain of the short exposure image sensor 224. Then in step S206, the method obtains an exposure ratio, which is denoted as E_ratio, of the long exposure to the short exposure, for example, by the exposure ratio calculator 260. Then in step S208, the method accumulates the pixel values of a line of the long exposure image, which is denoted as Sum_L; and in step S210, the method accumulates the pixel values of a line of the short exposure image, which is denoted as Sum_S; where the line of the short exposure image corresponds to the line of the long exposure image with the same scene. In step S212, a flicker gain "F_gain" is calculated by dividing the accumulated value Sum_L by the accumulated value Sum_S and further by the exposure ratio E_ratio, where the flicker gain F_gain can be expressed by the following equation: F_gain=Sum_L/(Sum_S×E_ratio). In step S214, the method eliminates rolling shutter flicker, before combining the long exposure image and the short exposure image into a composite image, by multiplying the pixels values of the line of the short exposure image by the flicker gain. The steps S208~S214 can be performed by the flicker gain detector 280.

Figure 3:
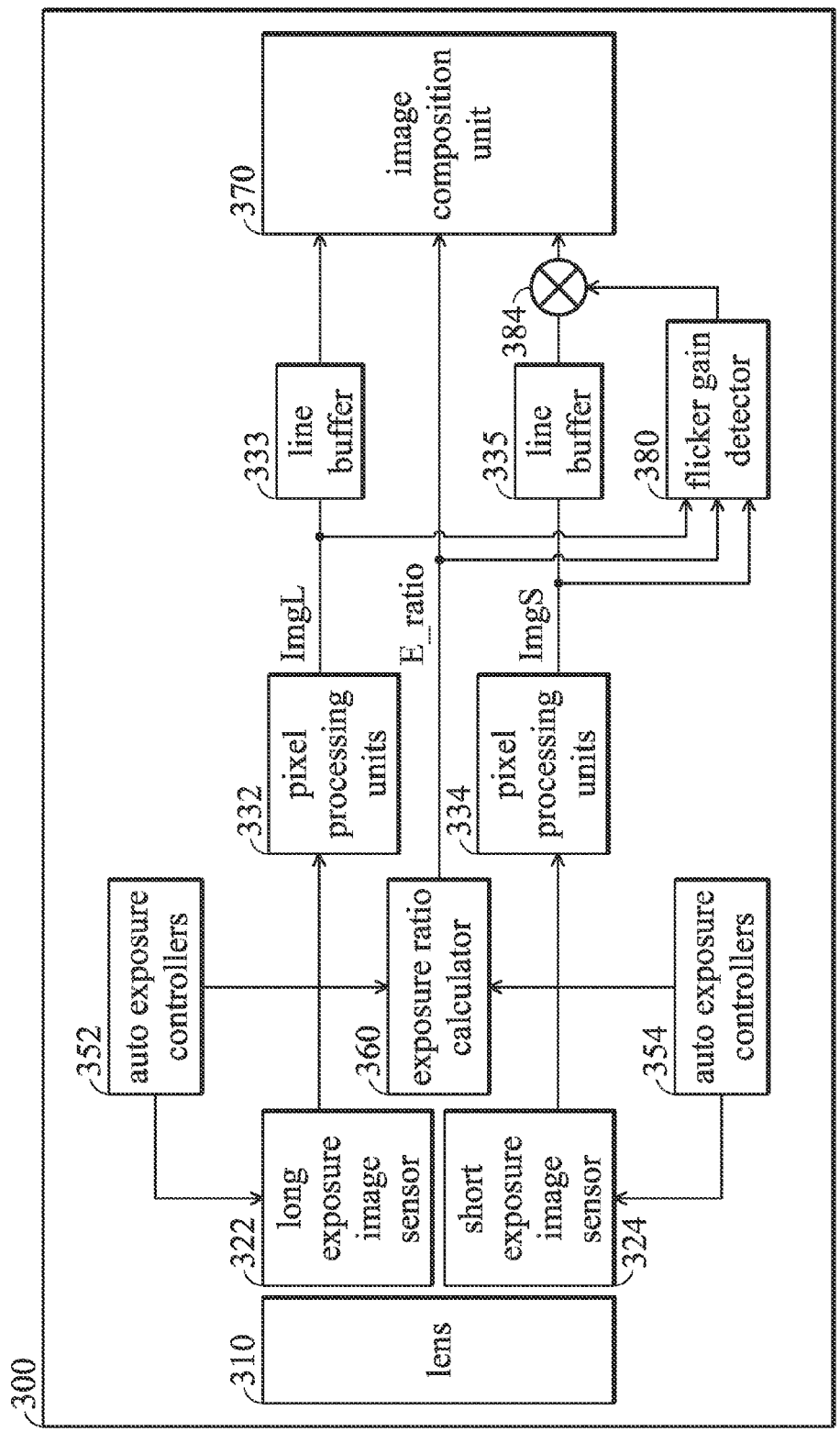
FIG. 3 is a schematic diagram of the multi-exposure imaging system according to a first embodiment of the present invention.

FIG. 3 is a schematic diagram of the multi-exposure imaging system according to a first embodiment of the present invention. In the multi-exposure imaging system 300, the long exposure image sensor 322 and short exposure image sensor 324 respectively capture images from the same scene via the same lens 310 (or different lens at another embodiment) with a long exposure and a short exposure, that corresponds to different exposure settings (including exposure time, gain of amplifier, etc.). The pixel processing units 332 and 334 respectively perform preliminary image signal processing operations for the images from the image sensors 322 and 324 to generate images ImgL and ImgS. The auto exposure controller 352 determines the long exposure to adjust the exposure setting of the long exposure image sensor 322; and the auto exposure controller 354 determines the short exposure to adjust the exposure setting of the short exposure image sensor 324. The exposure ratio calculator 360 can calculate an exposure ratio between the long exposure of the image sensor 322 and the short exposure of the image sensor 324.

The flicker gain detector 380 accumulates the pixel values of a line of the long exposure image ImgL, to generate an accumulated value Sum_L, and also accumulates the pixel values of a line of the short exposure image, to generate an accumulated value Sum_S. It is noted that the line of the short exposure image corresponds to the line of the long exposure image with the same scene. It is also noted that the accumulated portion of the image is not limited to a line, but maybe a block, part of a line, or plural lines in other embodiments. Then the flicker gain detector 380 calculates a flicker gain "F_gain" by dividing the accumulated value Sum_L by the accumulated value Sum_S and further by the exposure ratio E_ratio, where the flicker gain F_gain can be expressed by the following equation: . Finally, the compensator 384 compensates the pixel values of the line of the short exposure image from the line buffer 335 by the flicker gain for the image composition unit 370 to combine with the line of the image ImgL from the line buffer 333 based on the exposure ratio E_ration. In this embodiment, the compensator 384 is a multiplier for example, and does the compensation by multiplying the pixel values of the line of the short exposure image from the line buffer 335 by the flicker gain.

Figure 4:
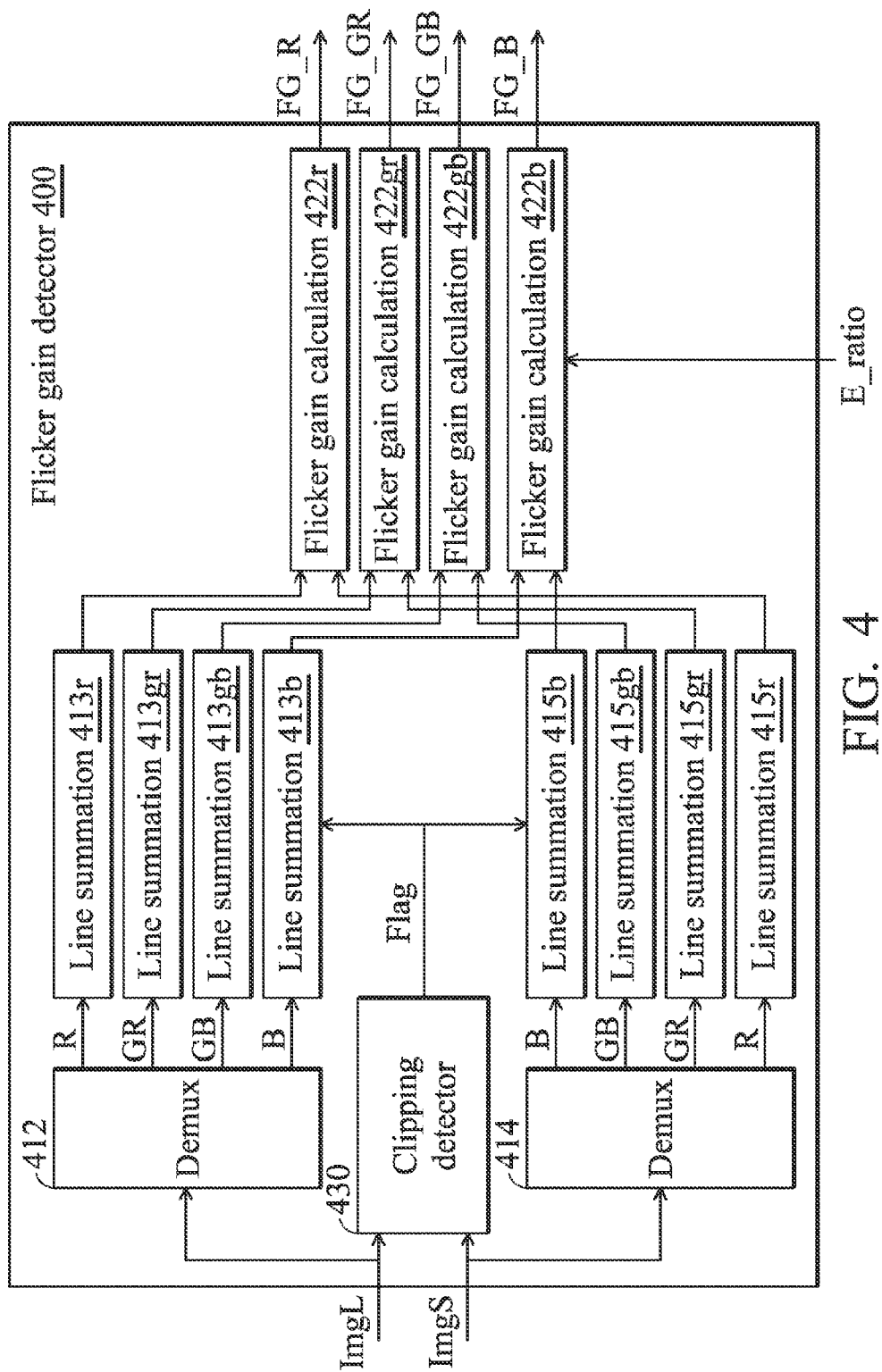
FIG. 4 is a schematic diagram of a flicker gain detector according to a first example of the present invention.

In some embodiments, the flicker gain detector may further comprise a clipping detector to exclude overexposed or underexposed pixel values of images ImgL and ImgS. Also the flicker gain detector may process the images based on the different color channels of a pixel. FIG. 4 is a schematic diagram of a flicker gain detector according to a first example of the present invention. The flicker gain detector 400 comprises a clipping detector 430, demultiplexers 412 and 414, line summations 413*r*, 413*gr*, 413*rb*, 413*b*, 415*r*, 415*gr*, 415*rb*, and 415*b*, and flicker gain calculations 422*r*, 422*gr*, 422*gb* and 422*b*. The flicker gain detector 400 uses demultiplexers 412 and 414 to perform color separation on the images ImgL and ImgS such that a pixel value of one pixel is separated into sub-pixel values based on corresponding color. Specifically, each pixel of a line of the image ImgL and a line of the image ImgS in this embodiment has subpixels representing individual colors, such as red R, green Gr, green Gb and blue B, that are separated by the demultiplexers 412 and 414, and output to the line summations 413r, 413gr, 413rb, 413b, 415r, 415gr, 415rb, and 415b.

Figure 5A:
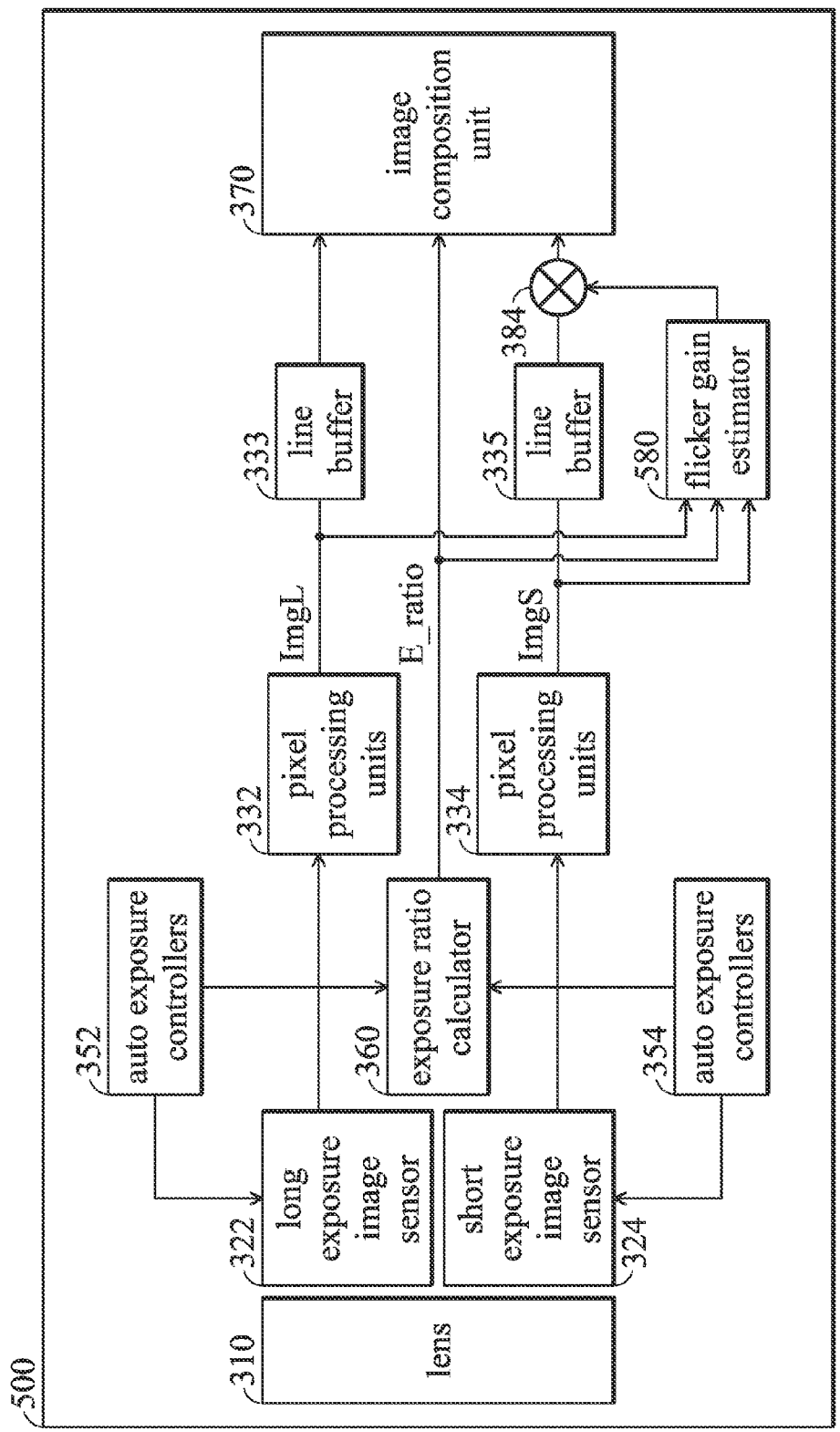
FIG. 5A is a schematic diagram of a multi-exposure imaging system according to a second embodiment of the present invention.
Figure 5B:
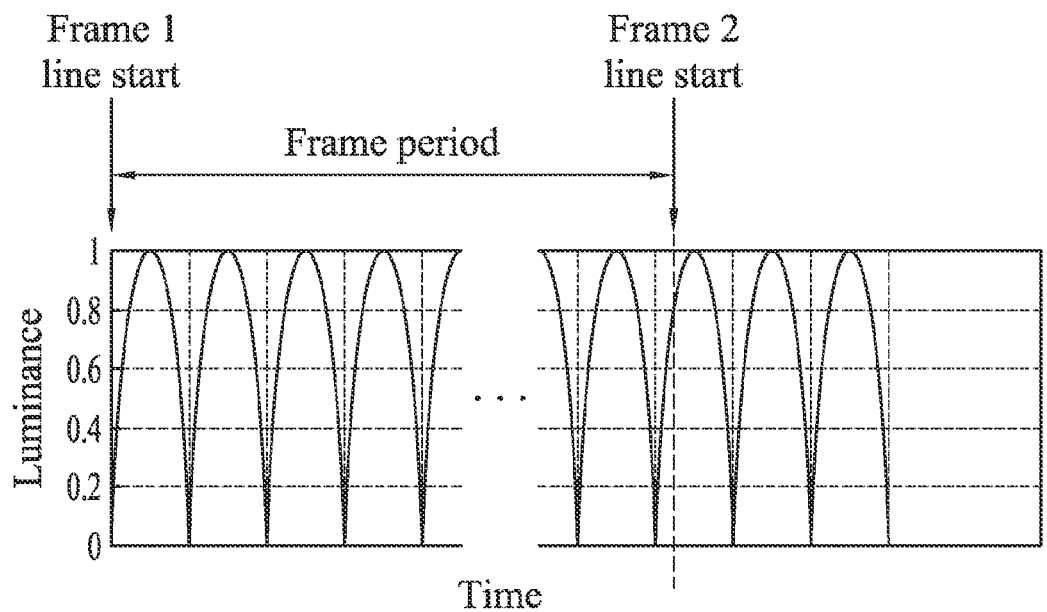
FIG. 5B is a schematic diagram of fluorescent light flickers at a frequency of 120 Hz.
Figure 5C:
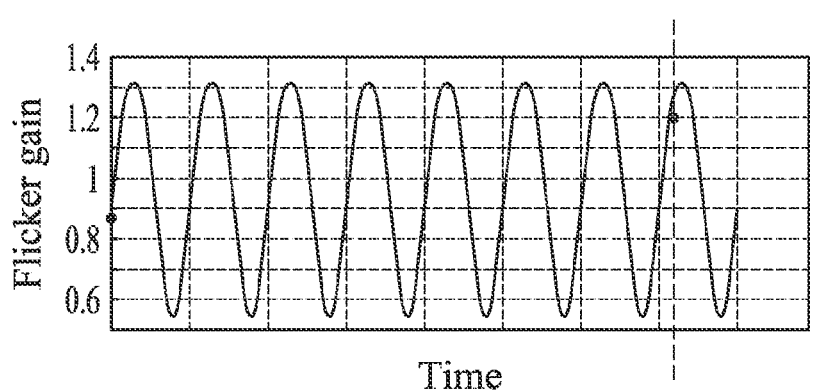
FIG. 5C is a schematic diagram of flicker gain.

The clipping detector 430 detects whether the pixel of the images ImgL and ImgS are overexposed or underexposed, and, if yes, the pixel will be ignored by the line summations based on the flag sent by the clipping detector 430. In another embodiment, the flag may be output to the demultiplexer 412 and demultiplexer 414 to ignore the overexposed or underexposed pixels. The line summations 413r, 413gr, 413rb, 413b, 415r, 415gr, 415rb, and 415b accumulate corresponding subpixel values to generate Sum_Lr, Sum_Lgb, Sum_Lgr, Sum_Lb, Sum_Sr, Sum_Sgb, Sum_Sgr, and Sum_Sb. The flicker gain calculation 422r generates a flicker gain FG_R based on the Sum_Lr, Sum_Sr and the exposure ratio E_ratio. The flicker gain calculation 422gr generates a flicker gain FG_GR based on the Sum_Lgr, Sum_Sgr and the exposure ratio E_ratio. The flicker gain calculation 422gb generates a flicker gain FG_GB based on the Sum_Lgb, Sum_Sgb and the exposure ratio E_ratio. The flicker gain calculation 422b generates a flicker gain FG_B based on the Sum_Lb, Sum_Sb and the exposure ratio E_ratio. The image composition unit 370 then combines the images ImL and ImS line by line FIG. 5A is a schematic diagram of a multi-exposure imaging system according to a second embodiment of the present invention. The multi-exposure imaging system 500 is similar to the multi-exposure imaging system 300 except the flicker gain estimator 580. As shown in FIG. 5B, the environment of the scene may has fluorescent light that has a periodic flicker at a frequency of 120 Hz, and the flicker gain accordingly changes as shown in FIG. 5C. Since the flicker is periodic, the flicker gain is also periodic. While shooting a video, plural frames are captured continuously, and the following frames can use flicker gain estimation to predict the proper flicker gain.

Figure 5D:
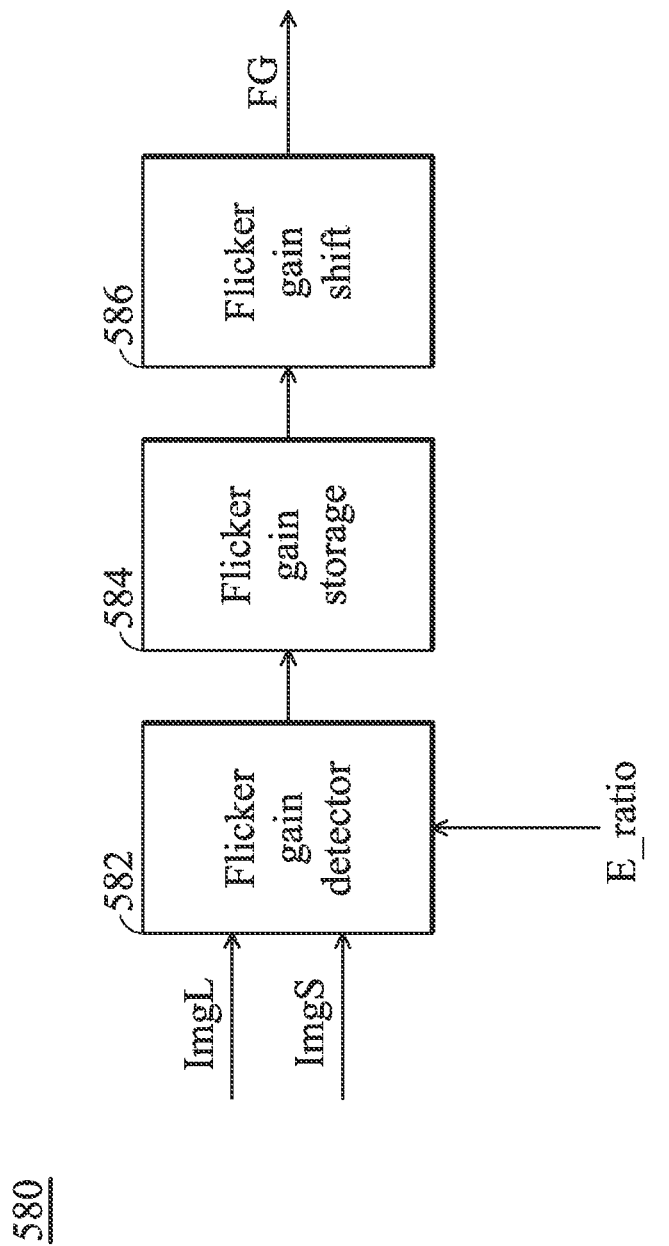
FIG. 5D is an example of a flicker gain estimator.

FIG. 5D is an example of a flicker gain estimator. The flicker gain estimator 580 comprises a flicker gain detector 582, a flicker gain storage 584 and a flicker gain shift 586. The flicker gain detector 582 acts as that described in the flicker gain detectors 280, 380 and 400, for detecting flicker gain of each line of the image ImgS. The flicker gain detector 582 may be activated for a few frames at the beginning of the video, and the following frames uses estimated flicker gains instead. The flicker gain storage 584 stores the calculated flicker gains from the flicker gain detector 582. Then the flicker gain shift 586 determines the proper flicker gain from the flicker gain storage 584 for the current line of the frame.

The flicker gain shift 586 first determines a line shift of the second frame from the first frame according to the following equation:

$$\text{Line\_shift} = (\text{Frame\_line}/\text{Flicker\_line} - [\text{Frame\_line}/\text{Flicker\_line}]) * \text{Flicker\_line}. \quad (1)$$

The Frame_line indicates the total lines per frame, the Flicker_line indicates the total lines per flicker period, and the operator [ ] is an integer function. Take a video with 30 frames per second, 300 lines per frame (Frame_line) for example, and the fluorescent light flickers at 120 Hz. Each flicker period is $\frac{1}{120}$ second and has [30*300/120]=75 lines per flicker period (Flicker_line). Thus, the Line_shift is zero according to equation (1), and the flicker gain shift 586 then apply the flicker gain of the first line of the first frame to first line of the second frame can use. Take a video with 29 frames per second, 421 lines per frame as a second example. The Frame_line is 421, the Flicker_line is [29*421/120]=101 (lines per flicker period), and the Line_shift is 17. Thus, the flicker gain shift 586 applies the flicker gain of the $18^{th}$ line of the first frame to the $1^{st}$ line of the second frame.

Figure 6:
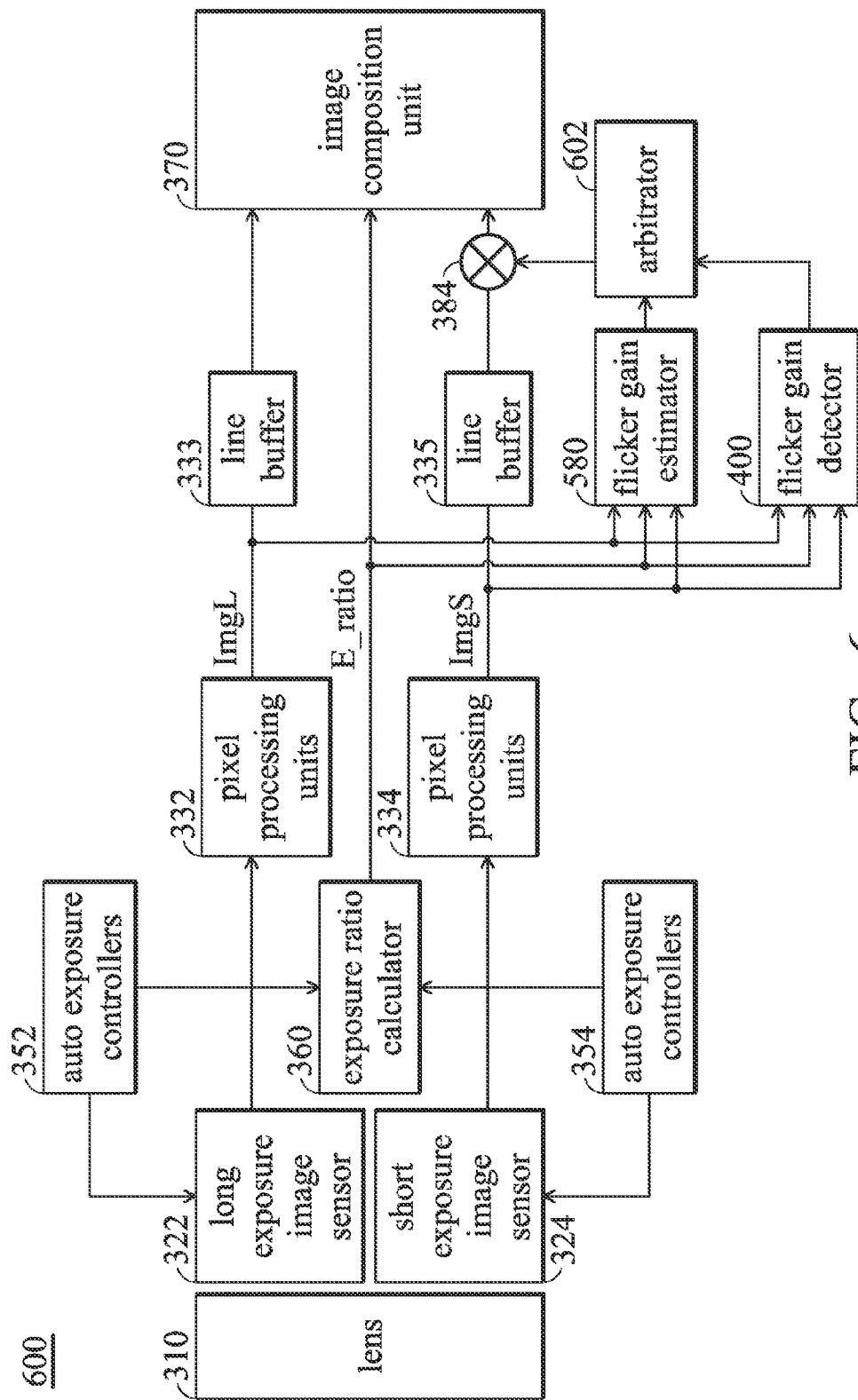
FIG. 6 is a schematic diagram of a multi-exposure imaging system according to a second embodiment of the present invention.

FIG. 6 is a schematic diagram of a multi-exposure imaging system according to a second embodiment of the present invention. The multi-exposure imaging system 600 is similar to the multi-exposure imaging system 500 and further includes a flicker gain detector 400 and an arbitrator 602. The multi-exposure imaging system 600 use both the flicker gain estimator 580 and the flicker gain detector 400 respectively to determine the flicker gains, and the arbitrator 602 determines a proper flicker gain to apply. For a scenario, the flicker gain estimator 580 is first used to determine the flicker gain, but may be inaccurate sometime after the video starts, so the arbitrator 602 may switch to use the flicker gain detector 400 to determine the flicker gain.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A multi-exposure imaging system, comprising:
   a long exposure image sensor for capturing a long exposure image based on a long exposure from a scene;
   a short exposure image sensor for capturing a short exposure image based on a short exposure from the scene;
   an exposure ratio calculator for obtaining an exposure ratio of the long exposure to the short exposure; and
   a flicker gain detector for generating a long accumulated value by accumulating pixel values of a portion of the long exposure image, for generating a short accumulated value by accumulating pixel values of a portion of the short exposure image corresponding to the portion of the long exposure image, and for generating a flicker gain according to the long accumulated value, the short accumulated value and the exposure ratio;
   wherein the portion of the short exposure image corresponds to the portion of the long exposure image with the same scene.

2. The system as claimed in claim 1, wherein the flicker gain detector generates the flicker gain by dividing the long accumulated value by the short average value and further by the exposure ratio.

3. The system as claimed in claim 1, further comprising:
   a compensator for compensates the pixel values of the portion of the short exposure image by the flicker gain; and
   an image composition unit for generating a composite image based on the compensated pixel values of the portion of the short exposure image and the pixel values of the portion of the long exposure image.

4. The system as claimed in claim 1, wherein the flicker gain detector comprises:
   a clipping detector for detecting underexposed or overexposed pixels of the long exposure image and the short exposure image, such that the flicker gain detector generates the short accumulated value and the long accumulated value without accumulating the underexposed or overexposed pixels.

5. The system as claimed in claim 1, wherein the portion of the long exposure image is a line of the long exposure image, and the portion of the short exposure image is a line of the short exposure image.

6. The system as claimed in claim 5, wherein the flicker gain detector comprises:
- a first demultiplexer for receiving the line of the long exposure image and separating pixel value of each pixel into sub-pixel value based on a corresponding color;
- a second demultiplexer for receiving the line of the short exposure image and separating pixel of each pixel into sub-pixel values based on corresponding color;
- a plurality of first line summations, each summing up the sub-pixel values of the same color from the first demultiplexer, such that the long accumulated value includes summed sub-pixel values based on corresponding colors;
- a plurality of second line summations, each summing up the sub-pixel values of the same color from the second demultiplexer such that the short accumulated value includes summed sub-pixel values based on corresponding colors; and
- a plurality of flicker gain calculations, each receiving the summed sub-pixel values of the same color respectively from the first line summations and the second line summations and receiving the exposure ratio for calculating the flicker gain.

7. The system as claimed in claim 6, wherein the flicker gain detector further comprises:
- a clipping detector for detecting underexposed or overexposed pixels of the long exposure image and the short exposure image, such that the first line summations and the second line summations generate summed sub-pixel values without accumulating the underexposed or overexposed pixels.

8. A multi-exposure imaging system for capturing a video under an environment with a periodic flicker, comprising:
- a long exposure image sensor for capturing a first long exposure frame based on a long exposure from a scene and subsequently capturing a second long exposure frame based on the long exposure;
- a short exposure image sensor for capturing a first short exposure frame based on a short exposure from the scene and subsequently capturing a second short exposure frame based on the long exposure;
- an exposure ratio calculator for obtaining an exposure ratio of the long exposure to the short exposure; and
- a flicker gain estimator for generating a second flicker gain of the second short exposure frame based on a first flicker gain of the first short exposure frame.

9. The system as claimed in claim 8, wherein the flicker gain estimator comprises:
- a first flicker gain detector for generating a long accumulated value by accumulating pixel values of a line of the first long exposure frame, for generating a short accumulated value by accumulating pixel values of a line of the first short exposure frame corresponding to the line of the long exposure frame, and for generating the first flicker gain according to the long accumulated value, the short accumulated value and the exposure ratio;
- a flicker gain storage for storing the first flicker gain from the first flicker gain detector; and
- a flicker gain shift for generating a line shift of the second short/long exposure frame to the first short/long exposure frame and accordingly estimating the second flicker gain.

10. The system as claimed in claim 9, wherein the line shift is determined based on a frame rate of the video, a frequency of the flicker, and line number of one frame of the video.

11. The system as claimed in claim 8, further comprising:
- a compensator for compensating the second short exposure frame by the second flicker gain; and
- an image composition unit for combining the second long exposure frame and the compensated second short exposure frame to generate a second frame of the video.

12. The system as claimed in claim 8, further comprises:
- a second flicker gain detector for generating a long accumulated value by accumulating pixel values of a line of the second long exposure frame, for generating a short accumulated value by accumulating pixel values of a line of the second short exposure frame corresponding to the line of the second long exposure frame, and for generating a third flicker gain according to the long accumulated value, the short accumulated value and the exposure ratio;
- an arbitrator for selecting one of the second flicker gain and the third flicker gain to output;
- a compensator for compensating the second short exposure frame based on the arbitrator; and
- an image composition unit for combining the second long exposure frame and the compensated second short exposure frame to generate a second frame of the video.

13. A method for eliminating flicker of a multi-exposure imaging system, comprising the steps of:
- capturing a long exposure image based on a long exposure from a scene;
- capturing a short exposure image based on a short exposure from the scene;
- obtaining an exposure ratio of the long exposure to the short exposure;
- generating a long accumulated value by accumulating pixel values of a portion of the long exposure image;
- generating a short accumulated value by accumulating pixel values of a portion of the short exposure image corresponding to the portion of the long exposure image with the same scene; and
- generating a flicker gain according to the long average value, the short average value and the exposure ratio.

14. The method as claimed in claim 13, wherein the flicker gain generating step generates the flicker gain by dividing the long accumulated value by the short average value and further by the exposure ratio.

15. The method as claimed in claim 13, further comprising:
- compensating the pixel values of the portion of the short exposure image by the flicker gain; and
- generating a composite image based on the compensated pixel values of the portion of the short exposure image and the pixel values of the portion of the long exposure image.

16. The method as claimed in claim 13, wherein the portion of the long exposure image is a line of the long exposure image, and the portion of the short exposure image is a line of the short exposure image.

* * * * *